US012767356B2

(12) United States Patent
Yost

(10) Patent No.: US 12,767,356 B2
(45) Date of Patent: Oct. 20, 2026

(54) SYSTEM AND METHOD FOR SMART SPHERICAL CLUSTER VESSELS

(71) Applicant: Thomas F. Yost, Chesapeake Beach, MD (US)

(72) Inventor: Thomas F. Yost, Chesapeake Beach, MD (US)

( * ) Notice: Subject to any disclaimer, the term of this patent is extended or adjusted under 35 U.S.C. 154(b) by 144 days.

(21) Appl. No.: 18/664,170

(22) Filed: May 14, 2024

(65) Prior Publication Data

US 2025/0388344 A1 Dec. 25, 2025

Related U.S. Application Data

(60) Provisional application No. 63/466,327, filed on May 14, 2023.

(51) Int. Cl.

| | |
|---|---|
| ***B64G 1/00*** | (2006.01) |
| ***B64B 1/08*** | (2006.01) |
| ***B64B 1/30*** | (2006.01) |
| ***B64G 1/26*** | (2006.01) |
| ***B64G 1/40*** | (2006.01) |
| ***B64G 1/64*** | (2006.01) |
| ***B64G 1/66*** | (2006.01) |
| ***B64G 4/00*** | (2006.01) |

(52) U.S. Cl.
CPC ................ *B64G 1/005* (2013.01); *B64B 1/08* (2013.01); *B64B 1/30* (2013.01); *B64G 1/008* (2023.08); *B64G 1/262* (2023.08); *B64G 1/40* (2013.01); *B64G 1/642* (2023.08); *B64G 1/6462* (2023.08); *B64G 1/66* (2013.01); *B64G 4/00* (2013.01); *B64G 2004/005* (2013.01)

(58) Field of Classification Search
CPC ........ B64G 1/64; B64G 1/642; B64G 1/6464; B64G 1/6462
See application file for complete search history.

(56) References Cited

U.S. PATENT DOCUMENTS 5,143,327 A 9/1992 Martin
5,145,130 A * 9/1992 Purves ...................... B25J 9/08 901/1
9,434,485 B1 9/2016 Lehocki
(Continued)

FOREIGN PATENT DOCUMENTS

CN 108648848 A 10/2018
CN 114684387 A 7/2022
(Continued)

OTHER PUBLICATIONS https://space.stackexchange.com/questions/38573/golfball-dimples-on-spaceships-and-planes Sep. 2019.*
(Continued)

*Primary Examiner* — Richard G Davis
(74) *Attorney, Agent, or Firm* — Jessica Smith; LOZA & LOZA, LLP

(57) ABSTRACT

A method and apparatus for smart spherical cluster vessels is described. In one example, a cargo ball assembly includes a plurality of cargo balls attached together to form a cluster, the cargo balls having a spherical exterior surface, a rocket engine cargo ball of the cluster having a plurality of thrusters exposed to an exterior position of the cluster to propel the cluster, and a thruster system to control the rocket engine to guide the cluster.

17 Claims, 9 Drawing Sheets

(56) References Cited

U.S. PATENT DOCUMENTS

| | | | | |
|---|---|---|---|---|
| 10,214,303 | B1 | 2/2019 | Turner et al. | |
| 2005/0017132 | A1* | 1/2005 | Janeke | B64G 1/40 244/171.1 |
| 2007/0012820 | A1 | 1/2007 | Buehler | |
| 2008/0265099 | A1 | 10/2008 | Carmarda et al. | |
| 2016/0075454 | A1* | 3/2016 | Smith, Jr. | B64G 1/40 244/171.1 |
| 2018/0327072 | A1* | 11/2018 | Price | B64C 1/061 |
| 2019/0023424 | A1 | 1/2019 | Helfajian et al. | |
| 2021/0024230 | A1 | 1/2021 | Glogowski et al. | |

FOREIGN PATENT DOCUMENTS

| | | | |
|---|---|---|---|
| DE | 19846327 | C1 | 3/2000 |
| FR | 2886271 | A1 | 12/2006 |
| RU | 2496688 | C2 | 10/2013 |

OTHER PUBLICATIONS

Related PCT/US2024/029321. International Search Report & Written Opinion (Oct. 30, 2024).

Corresponding PCT/US2024/029328. International Search Report & Written Opinion (May 8, 2025).

Chen. "Propulsion system characterization for the SPHERES formation flight and docking testbed." Diss. Massachusetts Institute of Technology (May 24, 2002). Submitted in Two Parts Due to File Size.

Rodgers. "Concepts and technology development for the autonomous assembly and reconfiguration of modular space systems." Thesis. Mass. Inst. Technology, Dept. Mechanical Engineering (Feb. 2006).

Related PCT/US2024/029321. Invitation to Pay Additional Fees (Aug. 13, 2024).

* cited by examiner

SYSTEM AND METHOD FOR SMART SPHERICAL CLUSTER VESSELS

CROSS REFERENCE TO RELATED APPLICATIONS

The present application claims priority under 35 U.S.C. § 119 to U.S. Provisional Application No. 63/466,327 entitled, "SPACE CARGO DIRIGIBLE AND LAUNCHER," filed May 14, 5023, and hereby expressly incorporated by reference herein.

U.S. patent application Ser. No. 18/663,335 filed May 14, 2024 entitled, "SYSTEM AND METHOD FOR A SUPERCONDUCTIVE, ELECTROMAGNETIC LAUNCHER", by inventor Thomas F. Yost, the entirety of which is incorporated by reference herein.

U.S. patent application Ser. No. 18/664,116 filed May 14, 2024 entitled, "SYSTEM AND METHOD FOR DIMPLED SPHERICAL STORAGE UNITS," by inventor Thomas F. Yost, the entirety of which is incorporated by reference herein.

U.S. patent application Ser. No. 18/663,355, filed May 14, 2024 entitled, "SYSTEM AND METHOD FOR A SPACECRAFT DOCKING STATION," by inventor Thomas F. Yost, the entirety of which is incorporated by reference herein.

U.S. patent application Ser. No. 18/663,365, filed May 14, 2024 entitled, "SYSTEM AND METHOD FOR A STRATOSHPERIC AIRCRAFT," by inventor Thomas F. Yost, the entirety of which is incorporated by reference herein.

FIELD

This application relates to systems and methods for a spacecraft and more specifically, to a smart spherical cluster vessel to transport cargo to space.

BACKGROUND

Current and future missions to outer space require that a significant amount of goods and materials be taken from our planet into outer space. Even the current space stations require frequent supply missions to sustain the people living there and to provide other materials for the station and for the work that is performed there. Currently almost all movement into outer space is performed using rockets which are made up primarily of the first and second stage with a small payload. The first and second stages have long cylindrical tanks and a rocket engine at one end. With some vehicles, the first stage can be recovered and reused, but the second stage often ends up as space junk. With other vehicles, it all ends up as space junk threatening manned and unmanned spacecraft.

To enjoyably travel and populate other worlds, there should be farms, hotels, towns, power, and plentiful water and food. On Earth, before a building is a building, before an airport is an airport, hundreds of dump trucks, delivery trucks, conveyer belts, dirt, steel, and concrete are needed. In Space, space cargo refers to the heavy lifting to transport into the solar system all of the materials needed to build a city's water & food supplies, infrastructure, shelter, and power plants to bring light & electricity for new worlds. Every city (even on Mars or the Moon) needs building materials, concrete, soil, fertilizer, oxygen, water, drilling equipment, pipes, and reactor parts. Space cargo can be used to provide materials to other worlds and also to send home Helium-3, the magic isotope that will ignite the future of clean Nuclear Fusion. Helium-3 will also provide the energy for the Moon itself, and the future buildout of the Solar System.

In view of the above disadvantages and others described in this specification, improved technologies for reusable space cargo vessels are needed that reduce costs, power, and environmental concerns.

SUMMARY

In one aspect, a cargo ball includes a spherical exterior surface, an interior within the exterior surface configured to hold cargo, a clamping surface, and a first peg clamped to the clamping surface and extending from the clamping surface, the first peg being configured to be clamped to a second peg of a second cargo ball.

In one aspect, a cargo ball includes a spherical exterior surface, a plurality of thrusters within an interior of the exterior surface, a removable portion of the cargo ball to expose the thrusters, and a thruster system to control the thrusters.

In one aspect a cargo ball assembly includes a plurality of cargo balls attached together to form a cluster, the cargo balls having a spherical exterior surface, a rocket engine cargo ball of the cluster having a plurality of thrusters exposed to an exterior position of the cluster to propel the cluster, and a thruster system to control the rocket engine to guide the cluster.

In another aspect a method includes collecting a plurality of cargo balls, assembling the cargo balls into a cluster, attaching the cargo balls together using a plurality of clamps, attaching at least one rocket cargo ball having a rocket engine to an exterior position of the cluster, and propelling the cluster to a destination using the rocket engine.

In one or more of the above aspects, the clamping surface is on the exterior surface.

In one or more of the above aspects, a hole is in the exterior surface and the clamping surface is within the hole.

In one or more of the above aspects, the first peg comprises a magnet to hold the first peg against the clamping surface.

In one or more of the above aspects, a plurality of dimples is in a pattern on the exterior surface.

In one or more of the above aspects, a plurality of thrusters are within an interior of the exterior surface.

In one or more of the above aspects, the cargo is fuel.

In one or more of the above aspects, the plurality of thrusters comprises four nozzles with thrust vectoring for directional control.

In one or more of the above aspects, a fuel line receives fuel from a second attached cargo ball.

In one or more of the above aspects, the removable portion is a hemisphere of the exterior surface.

In one or more of the above aspects, a cargo ball includes a clamping surface and a first peg clamped to the clamping surface and extending from the clamping surface, the first peg being configured to be clamped to a second peg of a second cargo ball.

In one or more of the above aspects, a space plane is attached to the cluster, wherein the space plane controls the thruster system.

In one or more of the above aspects, a fuel cargo ball of the cluster is coupled to the rocket engine cargo ball to provide fuel to the rocket engine cargo ball.

In one or more of the above aspects, at least a portion of the cargo balls comprise a clamping surface and a first peg clamped to the clamping surface and extending from the clamping surface, the first peg being configured to be clamped to a second peg of a second cargo ball.

In one or more of the above aspects, at least one fuel cargo ball containing fuel is attached to the lattice and a fuel line is coupled from the fuel cargo ball to the rocket cargo ball.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a process may be omitted from flow diagrams and descriptions presented herein in order not to obscure the aspects of the disclosure. Similarly, well known components in a device or well-known systems may be omitted from figures and descriptions thereof presented herein in order not to obscure the aspects of the disclosure.

A cargo ball is described that allows for cargo and people to be transported more efficiently and more easily than a multi-stage rocket with a small payload. The cargo ball may be "smart" in that it operates autonomously under computer control, or in that it may be piloted remotely through a radio or optical connection. A cargo ball provides an improved cargo container for space. A cargo ball can transport oxygen, soil, fertilizer, Helium-3 crystals, liquefied Helium-3, propellant, bushes, small trees, water, building materials, etc. and can be outfitted for crew quarters. A cargo ball can transport all of the materials necessary to build communities on other worlds.

Figure 1:
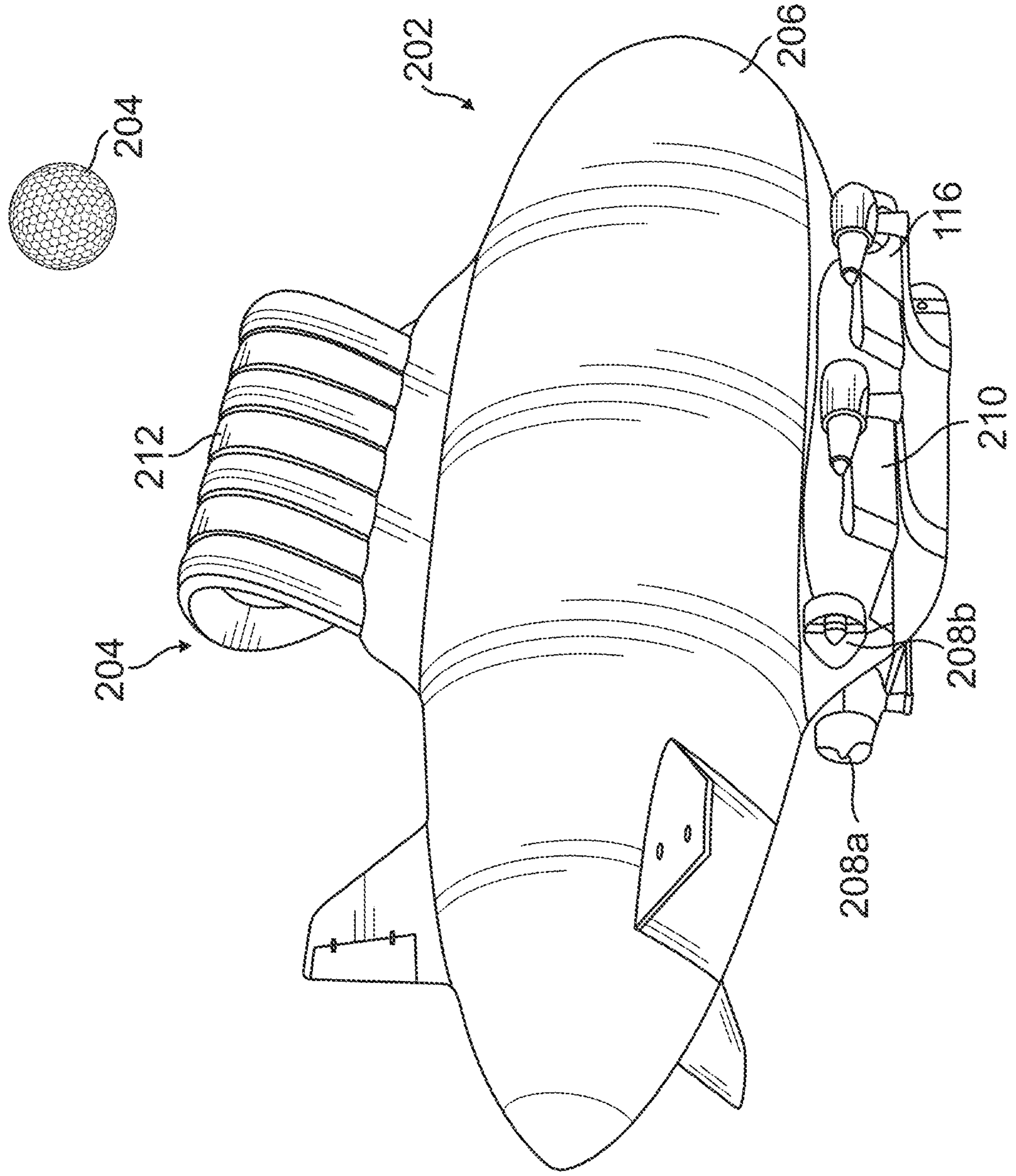
FIG. 1 is an isometric view of a launcher for a space vessel such as a cargo ball.

FIG. 1 is an elevational view of an exemplary embodiment of a launch system 204 and stratospheric aircraft 202. In one embodiment, the aircraft 202 may be a manned or unmanned airship, dirigible, blimp, or other vehicle transported by a lifting gas that is lighter than air. The aircraft 202 is configured to obtain stratospheric altitudes, e.g., altitudes in a range between 12 kilometers (km) and 50 km. The aircraft 202 includes a main structure or hull 206 that holds the lifting gas (such as helium and/or hydrogen) and one or more steering propellers 208. The propellers 208 may be adjustable to provide an upward thrust to gain altitude and for maneuverability. The aircraft 202 may further include an undercarriage or capsule 210 for storage of cargo if unmanned and/or for pilots if a manned aircraft 202. In another embodiment, the aircraft 202 may include an airplane, helicopter, hovercraft, or other type of airship.

The launch system 204 is integrated with and/or implemented on and/or positioned on the aircraft 202. The launch system 204 includes an electromagnetic, superconductive guideway formed by a plurality of twisted cylinders. Superconducting magnets are spaced throughout a guideway formed in the cylinders and generate powerful magnetic fields to levitate and/or propel a cargo ball 100. The cargo ball 100 may include a ferromagnetic vessel or one whose outer shell is made of superconducting material dipped with cryogenic liquid. The magnetic fields in the guideway accelerate the cargo ball 100 through the guideway in a controlled process until the cargo ball 100 reaches a predetermined velocity, such as Mach 2.5 to Mach 5.0. An exit hatch 212 is then opened in the guideway, and the cargo ball 100 is launched from the aircraft 202 at a preconfigured flight trajectory.

In an embodiment, the predetermined velocity is a velocity sufficient for the cargo ball 100 to reach space. The escape velocity may be determined using one or more factors such as an altitude of the aircraft 202, air pressure, temperature, wind speed, trajectory of the cargo ball 100, or use of thrusters on the cargo ball 100. This escape velocity for the cargo ball 100 will be far less than for rockets or other projectiles fired from the ground because the aircraft 202 launches the cargo ball 100 from the stratosphere. For example, when the aircraft 202 is at an altitude of 40 km, only an additional 40 km to 60 km more are needed for the cargo ball 100 to reach space. In one embodiment, the cargo ball 100 may be equipped with a propulsion system, such as thrusters, to obtain additional velocity and/or for maneuvering in the stratosphere or space.

The aircraft 202 and launch system 204 may be reused for multiple missions/flights and multiple cargo balls 100 may be launched during the same mission/flight of the aircraft 202. This reuse reduces the space debris left by traditional rockets from single use rocket stages. The aircraft 202 and launch system 204 also do not release dangerous emissions into the atmosphere. The system thus decreases the environmental impact in comparison to traditional rocket launchers that emit a large amount of greenhouse gases, such as carbon dioxide and water vapor, directly into the upper atmosphere. In addition, the design of the launch system 204 on the stratospheric aircraft 202 requires less power to launch the cargo balls 100 into orbit in comparison to traditional gun rails or other known launchers positioned on the ground. The configuration of the guideway of the launch system 204 also requires less space, and so the guideway is able to fit within the confined areas of the aircraft 202.

Though the aircraft 202 is described as an airship, in other embodiments, the aircraft 202 may be an airplane configured to fly to the stratosphere. Another exemplary embodiment of the aircraft 202 is a tilt-rotor aircraft, such as Bell Boeing V-22 Osprey®, which can fly like a helicopter and an airplane. In addition, some helicopters can reach altitudes in the lower stratosphere of approximately 12 km. These or other types of aircraft 202 may be used to launch the cargo ball 100. In addition, though described as launched from the stratosphere, the cargo ball 100 may be launched from another altitude by the aircraft 202. In another embodiment, the cargo ball may be launched from the ground by the launch system 204 or by another type of launcher, such as a rail gun, pneumatic cannon, or other device. In yet another embodiment, the cargo ball 100 may be transported into space as cargo, using a rocket, space shuttle, etc.

Figure 2:
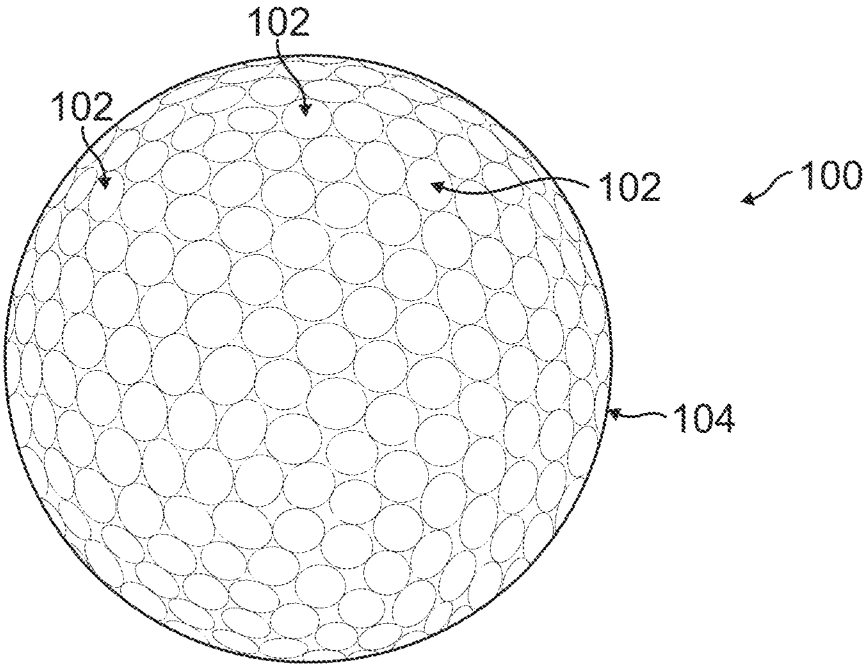
FIG. 2 is an isometric view of is an isometric view of an exemplary embodiment of a cargo ball.

FIG. 2 is an isometric view of an exemplary embodiment of the cargo ball 100. The cargo ball 100 has a spherical exterior shape that forms a plurality of dimples 102. The ferromagnetic material of the surface 104 is formed to include the small pits or dimples 102. The configuration, shape, number, and pattern of the dimples 102 may take any of a variety of different forms. For example, the dimples 102 may have a spherical circumference, hexagonal. The dimples 102 may cover an entire surface 104 of the cargo ball 100 (e.g., 90% or more), or substantially all the surface 104 (e.g., at least 60% or more), or a partially cover the surface 10 (e.g., 1% to 60%). The research that has been performed on golf balls may be applied to the dimples 102 of the cargo ball 100 with adjustments for the size of the cargo ball 100 and the characteristics of the expected environment with respect to air density and pressure. The cargo ball 100 may be driven by electromagnetic, pneumatic, or mechanical force or by a booster. Though the cargo ball 100 is shown as spherical, it may be substantially spherical, oval shaped, football shaped, spherical with a triangular portion for reducing drag, or other shape.

The dimples 102 on the cargo ball 100 may be used to create vortices and a turbulent layer that swirls about the surface of the ball decreasing the size of the wake. The dimples 102 may create a tiny layer of air around the cargo ball 100 that significantly cuts down drag. This tiny layer forces the air to flow over a larger portion of the cargo ball 100, which results in a much smoother ball flight.

These characteristics are enhanced by applying a spin to the cargo ball 100 when it is launched. Velocity, lift and distance may be increased due to the dimpled surface and/or spin of the cargo ball 100. For example, when a golf ball spins backwards, the air pressure underneath it is greater than above it, so the golf ball rises in the air. Dimples magnify this effect, contributing as much as 50% to the total lift of the golf ball. Similar to such dimpled golf balls, the dimpled cargo ball 100 may be deployed with a spin and so have a greater lift and travel farther through the stratosphere. In one example, a surface 104 of a cargo ball 100 with a 5-meter (m) diameter may include between 30,000 and 40,000 spherical dimples 102 with a depth of about 0.02 m to 0.1 m though other dimensions may be determined. In one example, the velocity necessary for such a cargo ball 100 launched from the stratosphere, e.g., at about a 40 km altitude, to reach space (e.g., 80 km to 100 km) is between Mach 2.5 to Mach 5. At this velocity, the cargo ball 100 will be able to reach space, e.g., to an 80 km to 100 km altitude. While air resistance at such altitudes is very low, at high speeds, the aerodynamic effects of the dimples 102 and/or the spin of the cargo ball 100 are still significant.

In another embodiment, the cargo ball 100 may also be launched from the ground. In one example, the cargo ball 100 may be launched from a high altitude above sea level, such as a from mountain or may be launched from polar or equatorial positions. In a ground launch from Earth, the dimples 102 on the surface of the cargo ball 100 and/or the spin of the cargo ball 100 are even more significant to generate lift. Such a ground launch requires a very high escape velocity that would cause significant friction and heat on the surface 104 of the cargo ball 100. The cargo ball 100 may be configured to endure such conditions with an increase in weight and a reduction in cargo capacity.

In another embodiment, the cargo balls 100 may be launched from the Moon, Mars, or a space docking station. Such launches from places with little to no atmosphere require a lower velocity due to thinner atmospheres. The cargo ball 100 may thus be launched into space with less force or speed from the Moon or Mars, e.g., using the launch system 204 or a rail gun, pneumatic cannon, rocket, or other device.

The velocity necessary to launch the cargo ball 100 into space is less than for a conventional rocket cylinder for several reasons. The dimples 102 on the surface 104 of the cargo ball 100 increases lift and allows the cargo ball 100 to travel a further distance, especially when a spin on the cargo ball 100 provides additional lift. When launched at about a 40 km altitude, instead of on the ground, only an additional 40 km is needed to reach space. At an 80 km to 100 km altitude, the cargo ball 100 may be configured to perform orbital maneuvers, including docking, de-spinning, deploying arms, thrusters, or connectors, etc. On a historical note, the Apollo missions performed their acrobatic maneuver called Transposition, e.g., docking, extracting, or flipping the Command and Service Module backwards to dock with the Lunar Module, at around 96 km before going to the Moon.

After the cargo ball 100 is launched, it may be captured at an intermediate destination using one or more different methods. For example, the cargo ball 100 may be configured to deploy one or more thrusters. The thrusters may be used to adjust the trajectory of the cargo ball 100, accelerate the cargo ball 100, de-spin the cargo ball 100 or maneuver to a particular point or destination.

Figure 3:
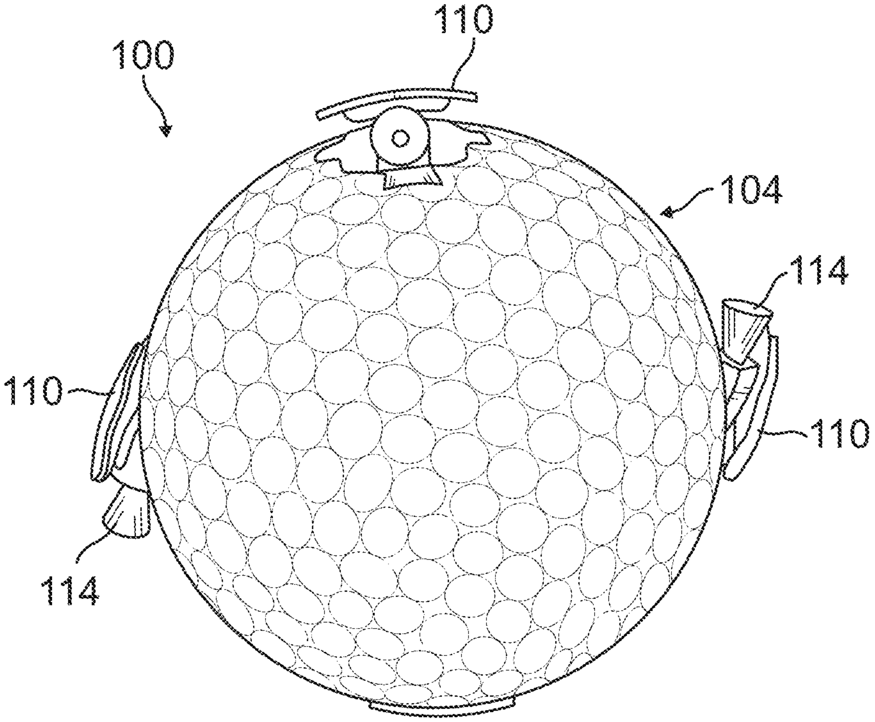
FIG. 3 is an isometric view of an exemplary cargo ball having covers as part of the exterior surface of the cargo ball and thrusters below each cover.

FIG. 3 is an isometric view of an exemplary cargo ball having one or more thrusters 114 and covers 110 of the cargo ball 100. The covers 110 have dimples the same or similar to the rest of the exterior surface 104 of the cargo ball 100. The covers 110 are pushed outwards from the center of the cargo ball 100 by suitable actuators, e.g., mechanical, electromagnetic, hydraulic, pneumatic, pyro bolts, etc. to expose thrusters 114. The thrusters 114 may be configured close to the surface of the cargo ball 100 as shown. In operation, the covers 110 are opened and the thrusters 114 are deployed from the cargo ball 100. When not needed, the thrusters 114 may be retracted back into the cargo ball 100, and the covers 110 closed. This process allows for a more compact construction within the cargo ball 100 and may be suitable for low power and intermittent use of the thrusters 114.

Figure 4:
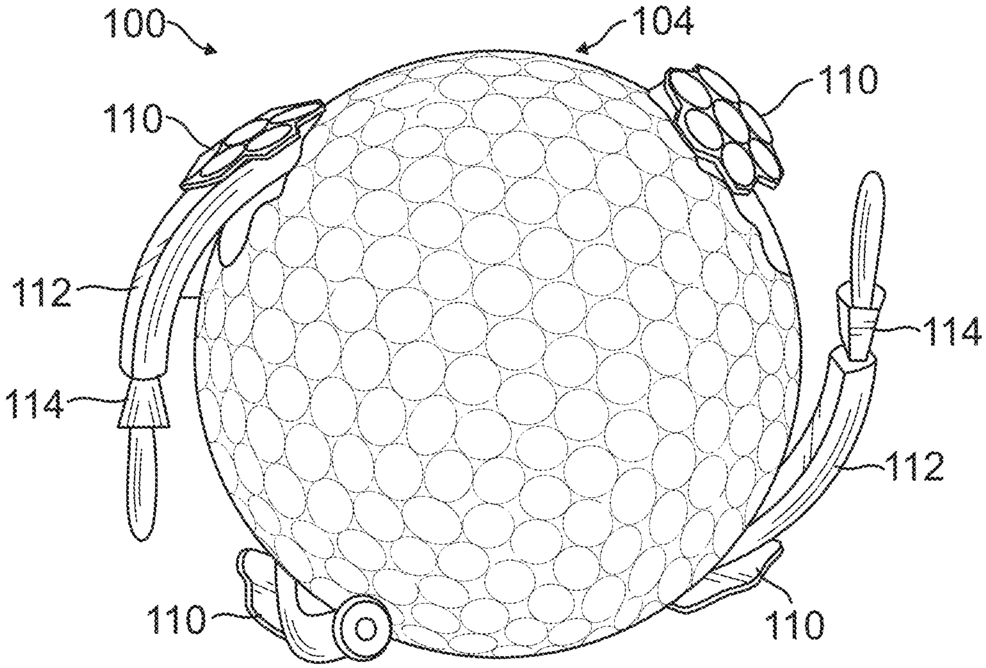
FIG. 4 is an isometric view of an exemplary cargo ball having thrusters carried on arms that extend from each cover in which the arms are configured for a spin or de-spin maneuver.

FIG. 4 is an isometric view of an exemplary cargo ball 100 having a plurality of thrusters 114 positioned within or on arms 112 that extend from within an interior of the cargo ball 100 exposed by the open covers 110. The cargo ball 100 has a set of covers 110, four in this example, which are pushed away from the surface 104 of the cargo ball 100. An arm 112 extends out from the opening revealed under the cover 110. A thruster 114 is configured at the end of each arm 112. The thruster 114 is extended away from the surface 104 of the cargo ball 100 at the end of each arm 112. In some examples the arms 112 are rotatable through some portion of a circle, e.g., 45 to 360 degrees to allow the thruster 114 to be directed in any desired direction. In one example, for a cargo ball 100 with a 5 m diameter, the arms 112 may extend between 0.5 m and 3 m.

The arms 112 allow the cargo ball 100 to maneuver, by manipulating the thrusters 114, to an orbiting rendezvous point or to a destination. In an example, a cargo ball 100 contains four equally spaced arms 112 with one maneuvering thruster arm 112 in each of four opposite quadrants of the outer surface 104 of the cargo ball 102. Before deployment, the cargo ball arms 112 are enclosed by the covers 110 that are a seamless part of the surface 104 of the cargo ball 100 with the same topical dimples and material characteristics. When the arms 112 are deployed, the covers 110 and thrusters 114 pop-out from the exterior surface 104 of the cargo ball 100 into propulsion and maneuvering positions. In some examples, the thrusters 114 have an adjustable amount of thrust and the arms 112 have the ability to swivel up to 360 degrees about a radial line from the surface 104 of the cargo ball 100. With four deployed arms 112 at multiple angles and variable thrust, the cargo ball 100 has a near unlimited number of combinations to adjust speed and to maneuver. Though four thrusters 114 and arms 112 are described, the cargo ball 100 may include one, two, three, four or more thrusters 114 and arms 112.

In a spin thrust maneuver, two or four arms 112 and thrusters 114 extend in opposite directions from opposite sides of the cargo ball 100, as shown in FIG. 3. The thrusters 114 on the two arms 112 fire to spin the ball 100 about an axis perpendicular to a line through the base of both of the thruster arms 114.

In a de-spin maneuver, the thrusters 114 are directed opposite the spin direction similar to the configuration as shown in FIG. 3 and fire counter to the spin direction.

Figure 5:
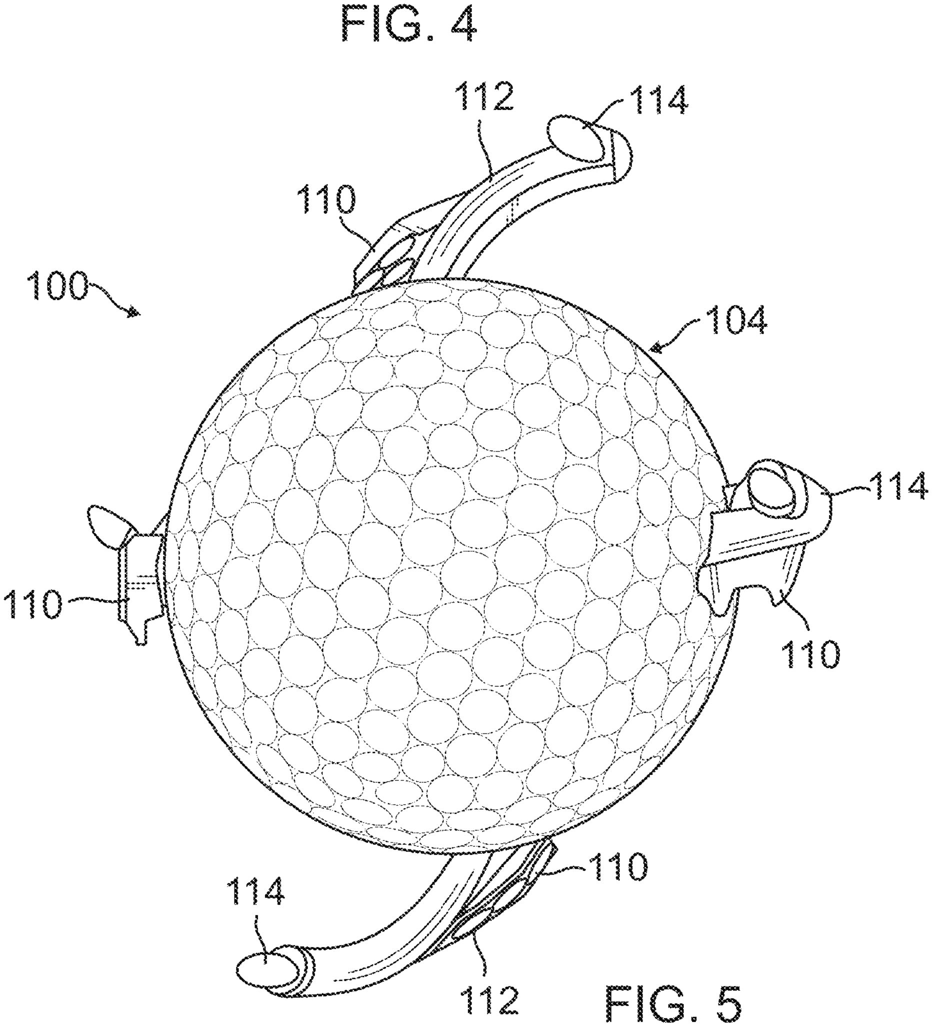
FIG. 5 is an isometric view of an exemplary cargo ball having thrusters carried on arms that extend from each cover in which the arms are configured for an acceleration maneuver.

FIG. 5 is an isometric view of an exemplary cargo ball 100 having thrusters carried on arms 112 that extend from each cover 110. In this configuration, the arms 112 are moved so that the thrusters 114 are substantially aligned or parallel and generate a force in a substantially same direction. In an acceleration maneuver, two or four thrusters 114 are aligned to point in the same direction such that the thrusters push the cargo ball 100 in one direction. The arms 112 may be moved during this maneuver for minor course corrections.

In one example, the thruster arms 112 remain deployed until the cargo ball 100 is recovered and refurbished for the next use. In another example, the thruster arms 112 may be retracted to suit later stages of the travel of the cargo ball 100.

Figure 6:
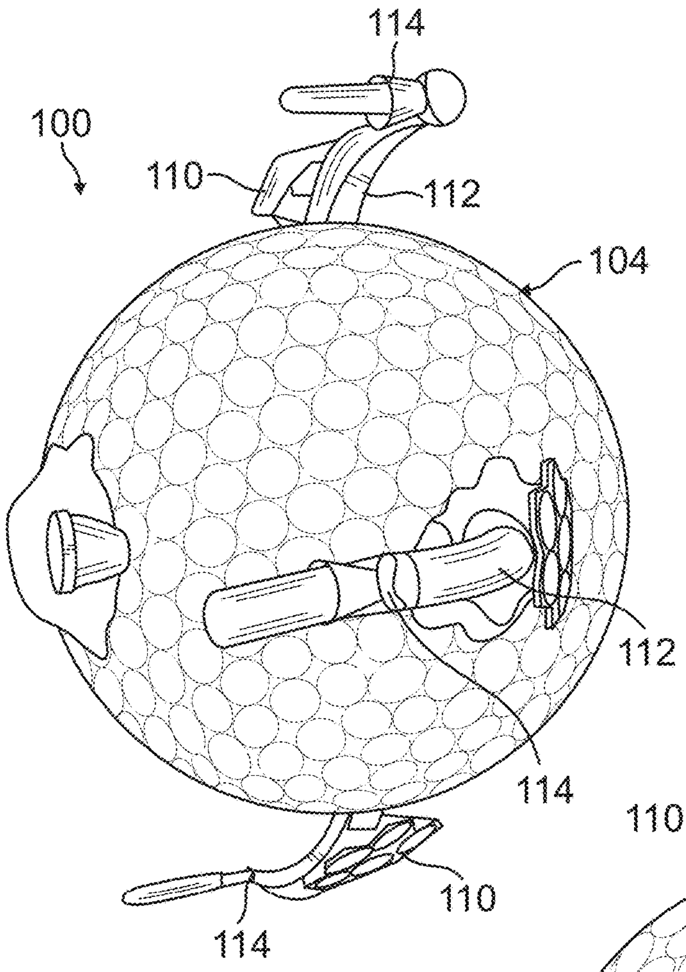
FIG. 6 is an isometric view of a cargo ball that has a cover for a main engine.
Figure 7:
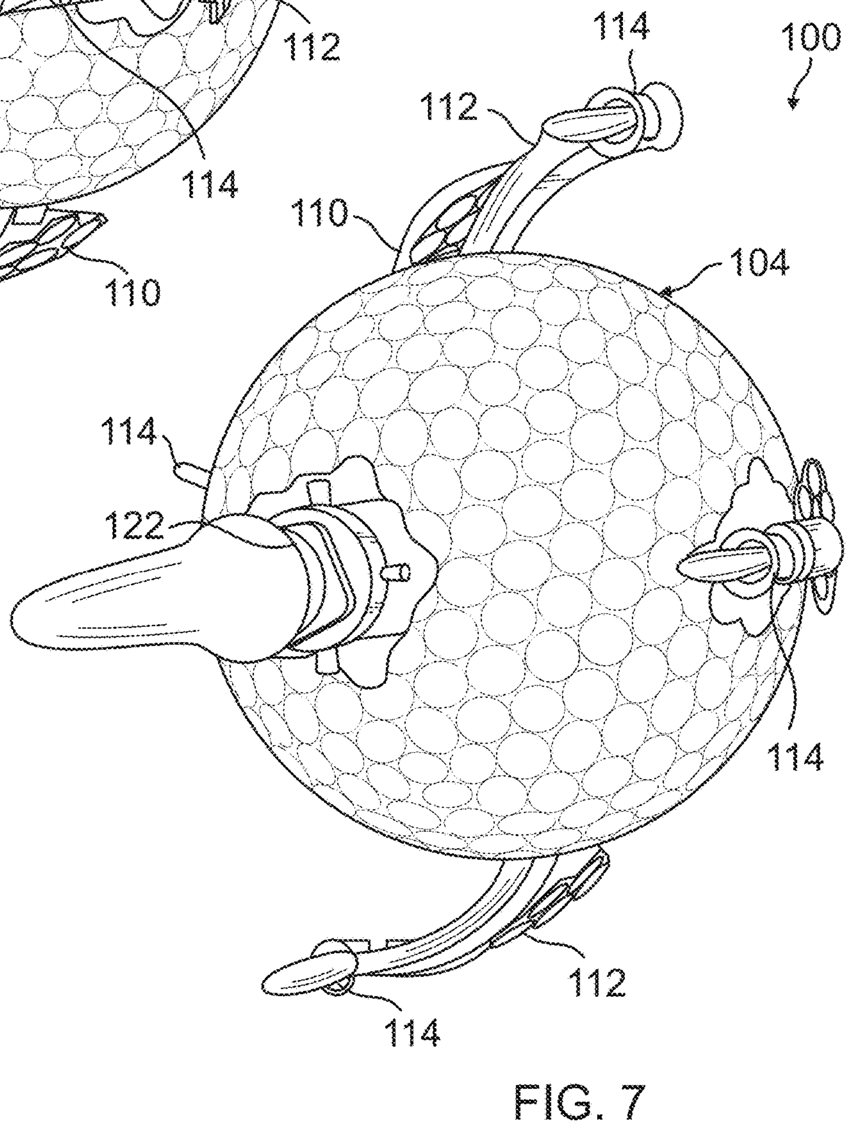
FIG. 7 is an isometric view of the cargo ball of FIG. 6 with a main engine and thrusters actuated.

FIG. 6 is an isometric view of a cargo ball 100 with a main engine 122 and a cover 120 for the main engine 122, wherein the cover 120 has just opened and revealed a nozzle of the main engine 122 as it begins to deploy. FIG. 7 is an isometric view of the cargo ball of FIG. 6 in which the cover 120 is open and the main engine 122 is fully deployed and thrusting. FIG. 7 is an isometric view of the cargo ball 100 of FIG. 6 in which the main engine 122 has been activated and all four of the thruster arms 112 are activated to provide additional thrust. The main engine 122 may be deployed alone or in combination with one or more of the thrusters 114. The thrusters 114 may also be used for course corrections or to adjust the orientation of the cargo ball 100. In an example the main engine 122 has a directional nozzle operating through mechanical, electromagnetic, or other means. The main engine 122 may be serve as a deployable large propulsion nozzle to add booster thrust. The main engine 122 may be used for the cargo ball 100 to reach higher orbits, geostationary orbits, and beyond. The available volume inside the cargo ball 100 will be reduced by the space required for fuel and equipment.

In operation, a cargo ball 100 is launched into the stratosphere or space. The cargo ball 100 may deploy the main engine 122 and/or one or more thrusters 114 to reach space. In another embodiment, the cargo ball 100 reaches space, and then the cargo ball 100 deploys one or more thruster arms 112, e.g., in this example four thruster arms, and maneuvers to a designated rendezvous location, e.g., a shipyard or base, where it may be gathered with other cargo balls 100, opened up to access the cargo, or any other suitable use may be applied to the cargo ball. The cargo ball is able to provide the building materials for a moon base: food supplies, mining equipment, reactor parts, oxygen, greenhouses, plants, water filtration, etc.

Accordingly, the cargo ball 100 operates in two or more modes. In a first mode, the cargo ball 100 has the one or more covers 110 closed and has a spherical surface 104. In this mode the cargo ball 100 is launched from a suitable mechanism with or without a spin. The cargo ball 100 then travels due to the energy applied from the launch. The cargo ball 100 has a smooth aerodynamic shape and presents a small aerodynamic drag through the atmosphere through which it is traveling. At some time after launch, the cargo ball 100 deploys thrusters 114 or a main engine 122 or both. This may be after the cargo ball 100 has cleared the atmosphere, after the momentum of the cargo ball 100 has declined, or when the cargo ball 100 is near a destination that requires maneuvers.

A cargo ball 100 may have an outer shell made from a thin ferromagnetic material that has been stamped or otherwise formed with a plurality of dimples 102. The material may be durable to be used as a building material at the destination or to survive reuse for another trip through space. In some examples, the outer shell may be made of multiple pieces held together by keyways so that the pieces may be unlocked with keys to access the cargo inside. In another example, an access port is unlocked to allow access through a tunnel to the cargo and the parts inside for refurbishment. In some examples, spherical or partial spherical building materials may be stored near the outer shell to provide a radius of curvature close to that of the outer shell. In some examples, human living quarters may be provided within the cargo ball 100 with a hatch for ingress and egress. A floor may be provided across the interior of the cargo ball 100 with room for food, environmental controls, air, and other supplies below the floor and above a ceiling.

Figure 8:
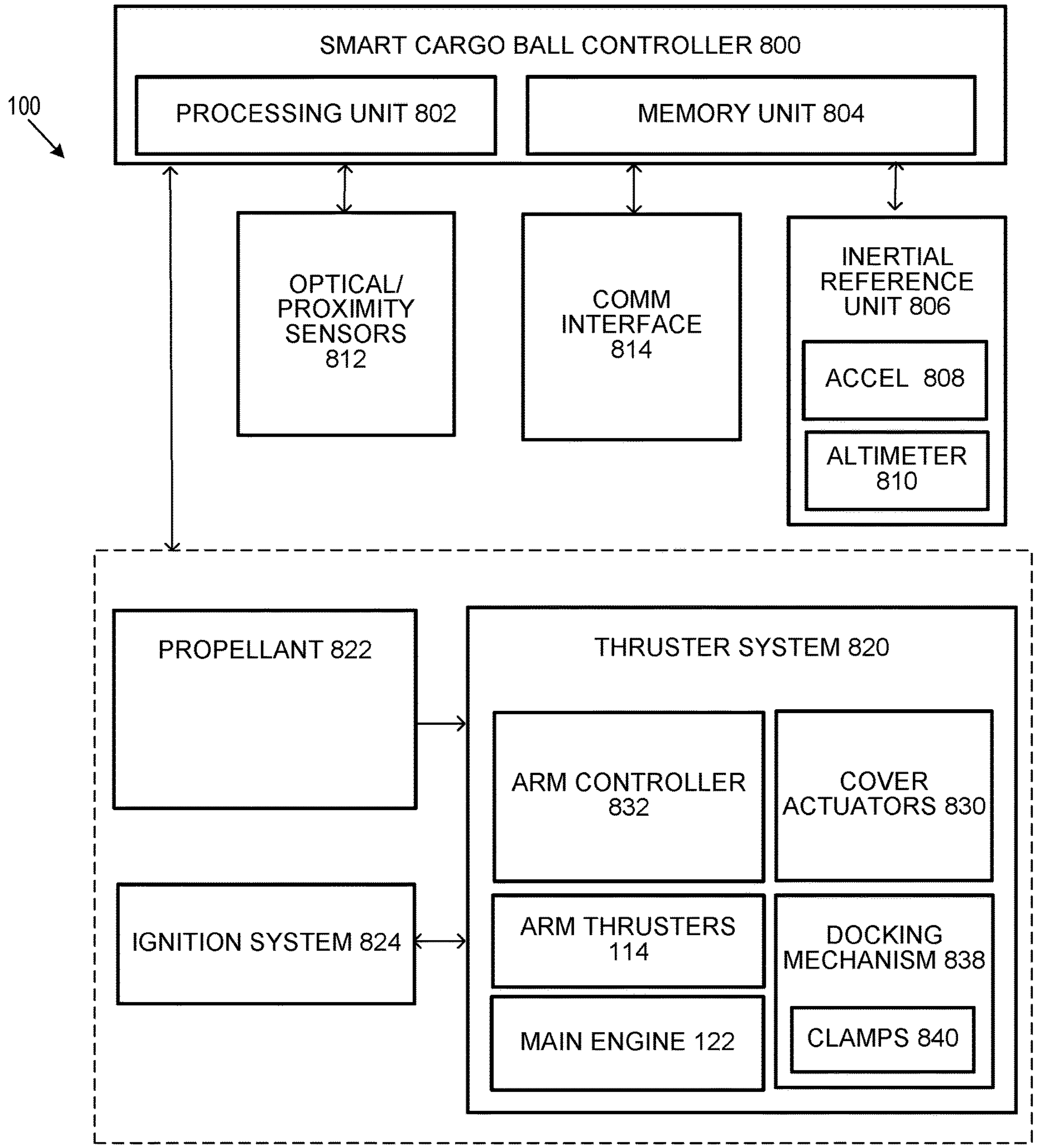
FIG. 8 is a block diagram of an exemplary embodiment of a cargo ball.

FIG. 8 is a block diagram of components of a cargo ball 100 as described herein. The cargo ball 100 has a smart cargo ball controller 800 in the form of a computing system. The controller 800 includes a processing unit 802, e.g., a microcontroller, microprocessor, field programmable gate array, or other processing unit. The controller 800 also has a memory unit 804 to store instructions and parameters for use by the processing unit 802. The controller 800 is coupled to a variety of peripheral devices suitable for the intended mission.

An inertial reference unit 806 may be provided and coupled to the controller 800 to determine the circumstances, behavior, and attitude of the cargo ball 100. The inertial reference unit may include accelerometers (Accel) 808, an altimeter 810, and other instruments or sensors including a gyroscope, barometer, gravitometer and other instruments. Optical and proximity sensors 812 e.g., cameras, laser rangefinders, lidar etc. may be coupled to the controller 800 to determine the positions and range of obstacles and targets. One or more communications interfaces (Comm Interfaces) 814 may be provided and coupled to the controller 800 to allow for remote operation or for the cargo ball 100 to report status and position among other information. A wired or near field communications interface may be configured to allow a user to set initial programming and parameter before a mission or to allow a history or log file to be extracted after a mission.

The cargo ball 100 may also include a thruster system 820 coupled to propellant 822 or fuel to power the one or more thrusters 114 and other components. An ignition system 824 may be coupled to the thruster system 820 to actuate one or more thrusters 114 of the thruster system 820. The thruster system 820 may include cover actuators 830 to open or close the one or more covers 110, an arm controller 832 to deploy, direct, and retract the one or more arms 112, one or more arm thruster 114 to maneuver the cargo ball 100, and a main engine 122. The thruster system 820 may also include a docking mechanism 838 with clamps 840 configured to enable the cargo ball 100 to be attached or attach itself to another structure at a destination. The thruster system 820 is coupled to the controller 800 to receive commands for the operation of the thruster system 820 and to report status to the controller 800.

Using the controller 800, the cargo ball 100 may be made "smart" for autonomous, or semi-autonomous operation. Alternatively, the cargo ball 100 may be controlled remotely. The cargo ball 100 may also be monitored as it sends location and status information through the communications interface 814.

As described above, using a launcher, multiple cargo balls may be sent to a destination in space. The cargo balls may use thrusters incorporated into the cargo ball to maneuver more precisely to a particular location. The cargo balls may use thrusters or a main engine to travel beyond the range of the launcher to arrive at a destination. For an intermediate destination, the cargo balls may be sent individually or in groups to a final destination. For some missions, the cargo balls may be attached together and guided to a further final destination. So that most of the cargo balls primarily contain cargo or crew, specialized cargo balls may be used to provide the propulsion to carry the other cargo balls to the final destination. The specialized cargo balls may include a large rocket engine cargo ball and a fuel or propellant tank cargo ball.

In one scenario, the cargo balls are assembled into a giant cluster for a trip to Mars or beyond. Some of the cargo balls are fitted with large thrusters or main engines for a burn to the far way final destination. A moon base and orbiting spacecraft will gather cargo balls together into a cluster. Several cargo balls fitted with booster rockets are positioned strategically on the edge of the cluster. These cargo balls open up halfway exposing thrusters that provide the energy to move the cluster to Mars. A web may be used to collect the cargo balls and a robotic spider may be used to assemble them into the cluster with the booster rocket cargo balls at one end. Helium-3 reactors on the destination base or in the cargo balls may be used to power the booster rockets and to power new forests, farms, towns, and cities on Mars and beyond.

In another scenario a completed vessel from an orbiting shipyard is fully operational and blasts off to the moon or beyond. Other space vehicles such as tanks or personnel carriers may be attached to the vessel and come along for ride. The completed vessel is a space cargo ship with as many rocket engines as required by the mass and configuration of the cluster. The cargo balls provide the building materials for the moon base, food supplies, mining equipment, reactor parts, oxygen, greenhouses, plants, water filtration and even a ground-based cannon to send home Helium-3 in refitted cargo balls. In addition to the items needed to establish the moon base, e.g., soil, seeds, plants, pipes, power lines, trees, fertilizer, farm animals, water purification parts, mining, building material, drilling components, windows, food, and reactor parts. These items are also required for the Mars journey. Disassembled traditional larger rocket components can also be shipped to Mars in cargo balls, then reassembled on the Red Planet. These rocket parts can be reassembled to blast off from Mars for a return trip to Earth.

In another scenario, a geostationary orbiting space cargo shipyard station has an approximate altitude of 35,786 km above the earth. Other shipyards can be placed in orbit around other moons and planets. Dynamic robotic spiders attach cargo balls with a peg, magnetic hole and clamp system forming a cluster vessel as a space cargo ship with interchangeable parts. Like a container ship in space without a hull, many cargo balls can be attached together and guided together as a single cluster to their destination. A giant cluster of cargo balls can be prepared by a robotic spider for the journey to the Moon or Mars. With this technique, a city on the Moon and a town on Mars with forest & farms can be achieved within our lifetimes. To propel the space cargo ship, specialized cargo balls are fitted on Earth with a rocket engine inside, then launched to the geostationary shipyard by a stratospheric launcher. The robotic spider will pop the hood of the cargo ball to open it up into two halves. This exposes half of the cargo ball to space and a rocket engine with 4 nozzle cones automatically moves into a propulsion position outside of the shell.

Figure 9:
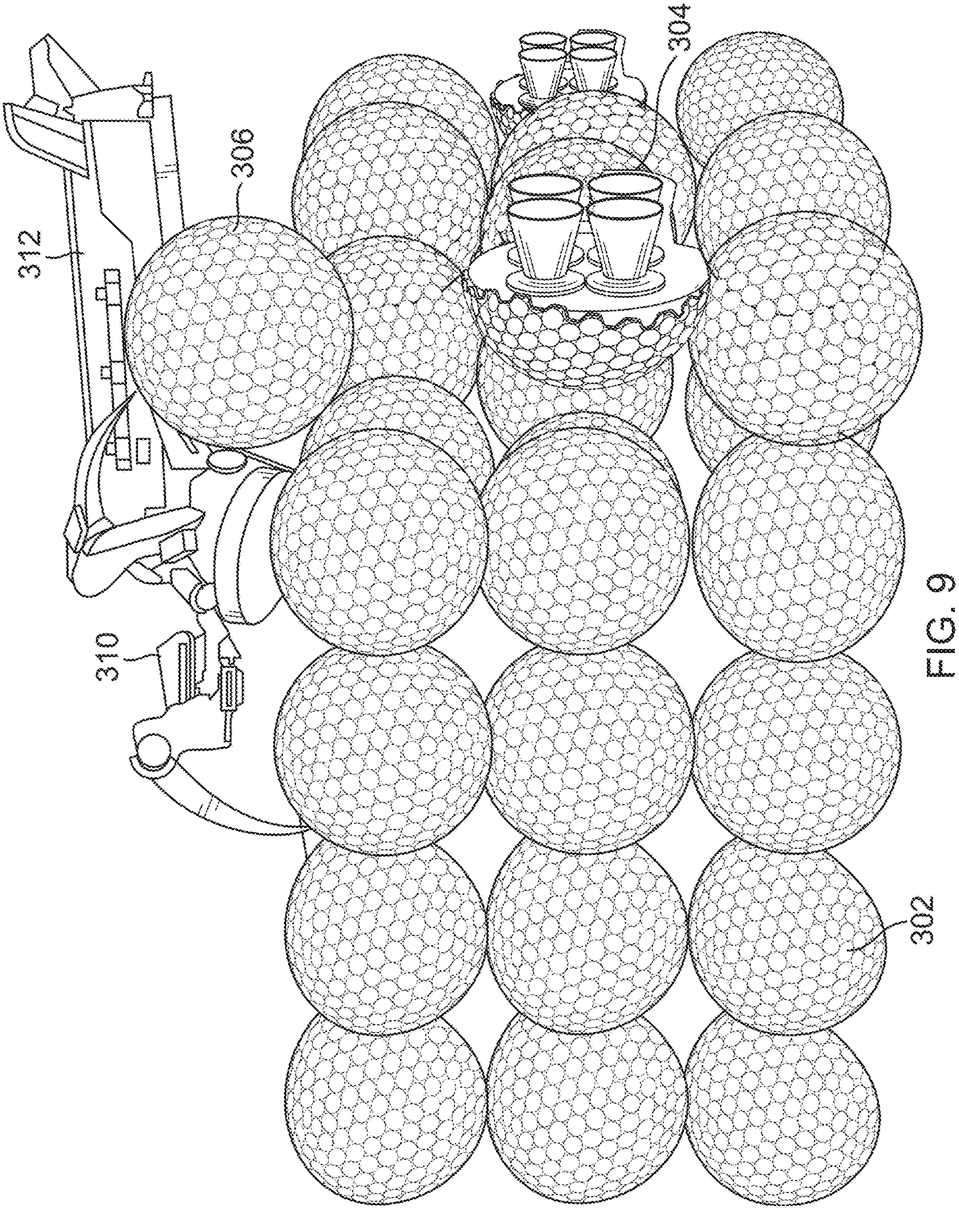
FIG. 9 is a perspective side view of a cargo ball cluster being assembled.

FIG. 9 is a perspective side view of a cargo ball cluster being assembled. The cluster is formed of multiple cargo balls 302 in this case 60. The cargo balls 302 may be the same or similar to the cargo balls 100 described in FIGS. 1-8. A space plane 312, e.g., an orbital space plane, is attached over the cluster to provide for larger cargo or passengers or both. The space plane 312 may also be configured as a command vehicle to pilot the cluster after it has been configured. Other types of vessels may also be attached to the cluster as desired for transit to the destination. The cargo balls 100 are being assembled into a cluster by a robotic spider 310, although any suitable assembly technology may be used. In other examples, a gantry crane, tracked arm, or other device may be used to assemble the cargo balls. As shown, the robotic spider is lowering one of the cargo balls 306 into place on the cluster. The cluster can be built one layer at a time in the near-zero gravity environment, or the robotic spider can start at the center and work outwards, or any other suitable pattern may be used.

A specialized rocket engine cargo ball 304 is used in the middle layer to power the cluster after it is assembled. The rocket engine cargo ball 304 has a plurality of thrusters, in this case four rocket engine nozzles. A portion of the cargo ball 304 has been removed to expose the thrusters. The four nozzles may include thrust vectoring for directional control of the cluster. A guidance system may be coupled to a thruster system to control the thrusters. Alternatively, the main engine 122 of a cargo ball 100 such as that of FIG. 7 may be used. Multiple rocket engine cargo balls 304 may be used to power the cluster.

Figure 10:
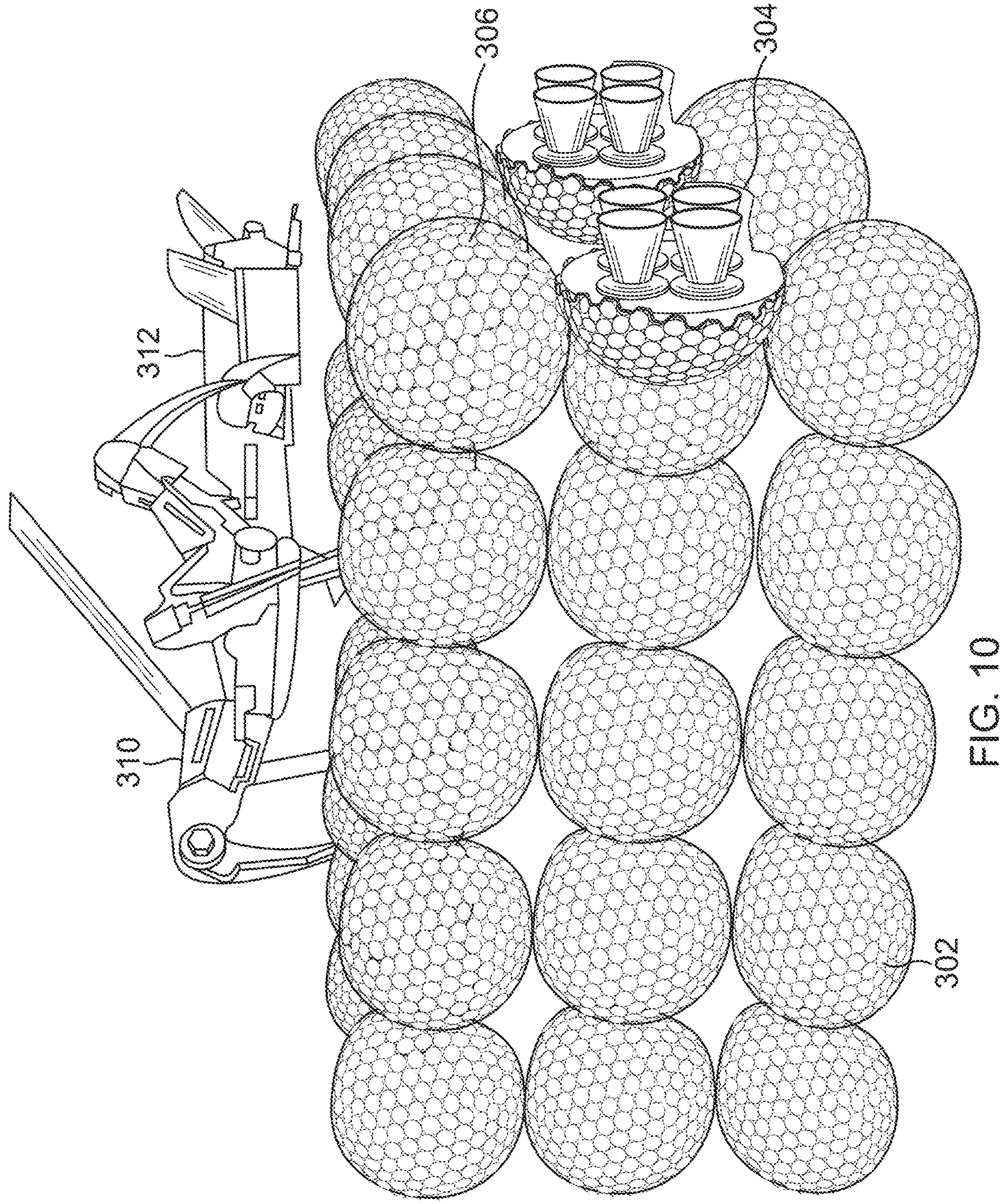
FIG. 10 is a perspective side view of a cargo ball cluster after it has been assembled.

FIG. 10 is a perspective side view of a cargo ball cluster after it has been assembled. The one of the cargo balls 306 has been clamped into position at the top rear of the cluster. The space plane 312 is still attached and the robotic spider 310 has completed the assembly.

The robotic spiders 310 have assembled the cargo balls 100 to form a lattice structure of interlocking cargo balls 100. A space plane 312 is attached. In this way the orbital shipyard provides coupling and maintenance for the cargo balls in preparation for travel to the Moon and Mars. A large cluster of linked cargo balls can travel with the space plane to bring all the building materials, food, water, soil, seeds, fertilizer, concrete, supplies, and oxygen to build cities and towns on the Moon and Mars. A second orbital shipyard around the Moon or Mars may be used to disassemble the cargo balls 100 for individual descent to the surface or to assemble new cluster vessels to send back to Earth or another destination.

Figure 11:
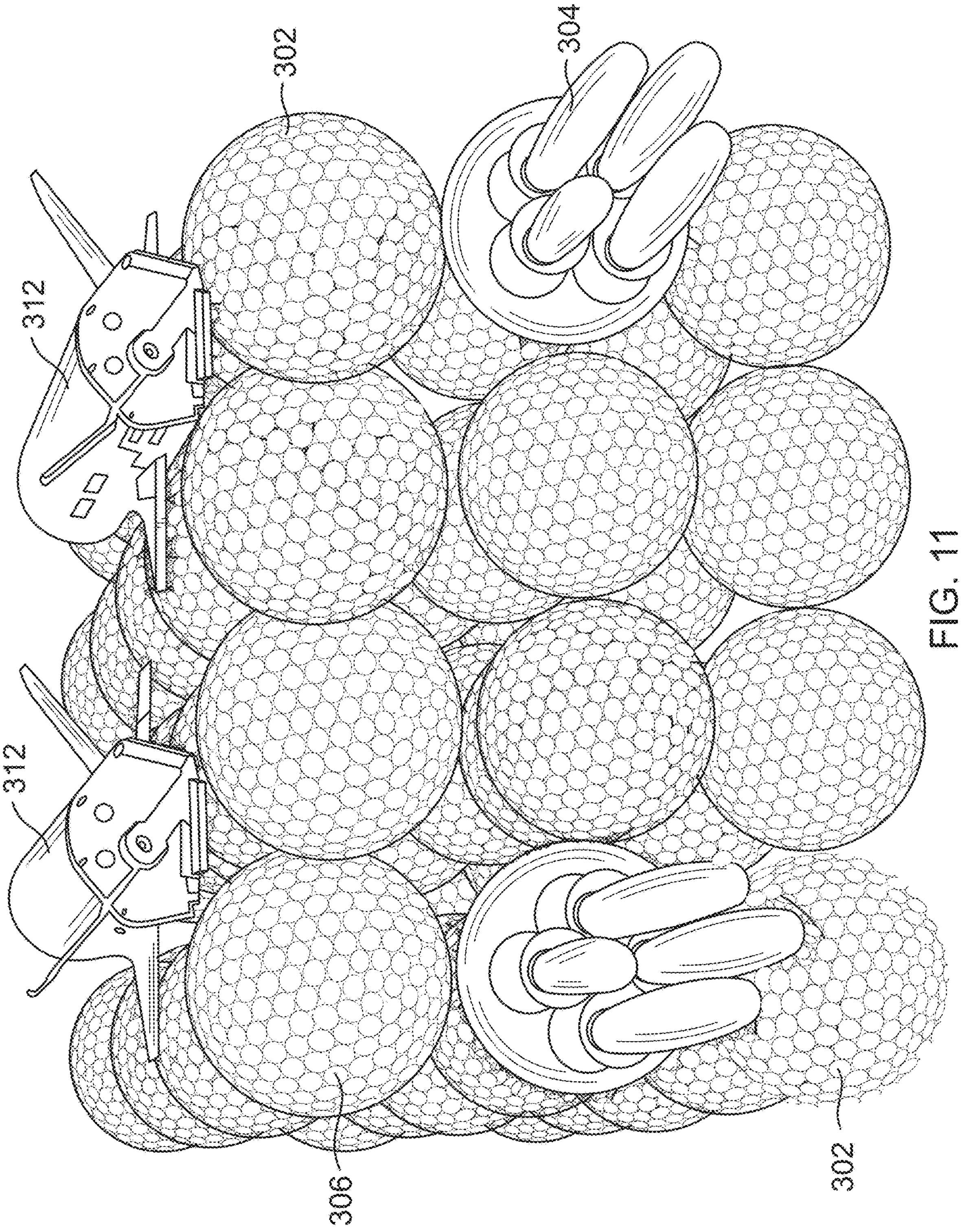
FIG. 11 is a perspective rear view of a cargo ball cluster in flight.

FIG. 11 is a perspective rear view of a cargo ball cluster in flight. This cluster has multiple cargo balls 302 (e.g., the same or similar to cargo balls 100) clamped together into an array. In this example the array has 60 cargo balls 302, however a larger or smaller number of cargo balls 302 may be used. Two space planes 312 are clamped to the top of the cluster and two rocket engine cargo balls 304 are installed at the rear of the cluster. The rocket engine cargo balls 304 may be controlled by the space planes 312 and the space planes 312 may also use onboard engines for added thrust for acceleration, for maneuvering or both. Additional maneuvering thrusters (not shown) may be added to the cargo ball cluster for additional maneuverability. The robotic spider has left the cluster and returned to another part of the orbital shipyard. In some scenarios, the robotic spider may travel with the cluster to perform operations at the destination with the cluster or to assemble or construct other structures.

Figure 12:
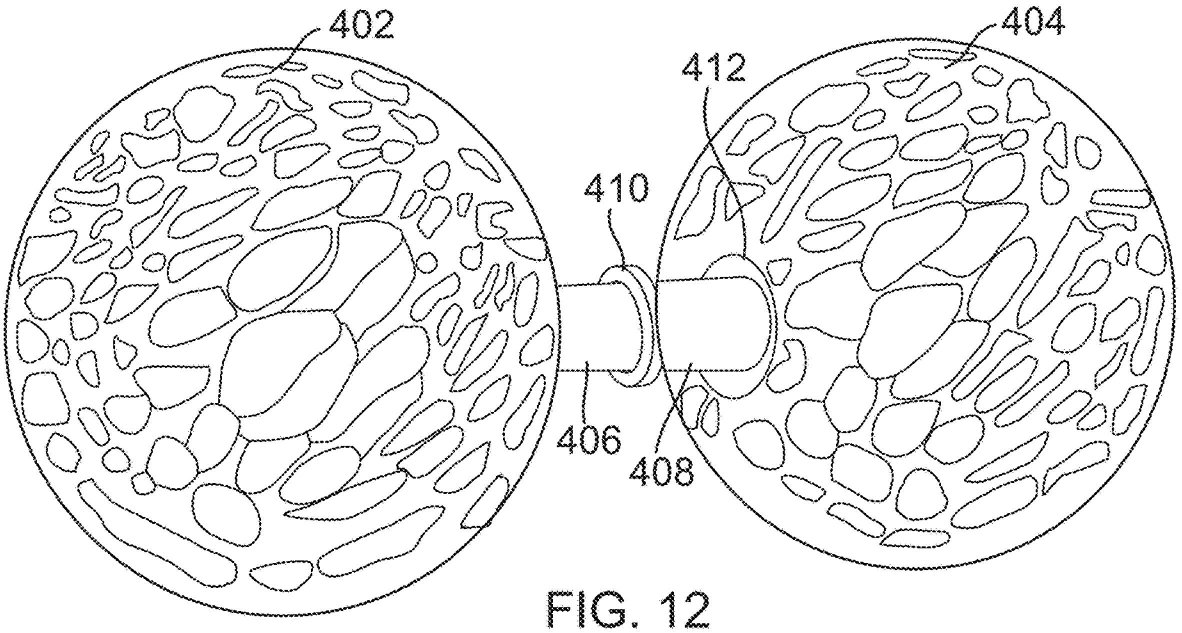
FIG. 12 is an isometric side view diagram of a connection between two cargo balls.

FIG. 12 is an isometric side view diagram of a connection between two cargo balls. A first cargo ball 402 has a first peg 406 to be clamped to a second cargo ball 404 that has a second peg 408. The first peg 406 and the second peg 408 are held together using a clamp 410 between the two. The clamp may use a mechanical, hydraulic, pneumatic, magnetic, or other mechanism to hold the two pegs together. Each peg attaches to the respective cargo ball through a hole 412 in the cargo ball 404. While only one hole 412 is shown, there may be more or fewer. For some of the cargo balls four holes in equal quadrants in the cargo balls may be used. A robotic spider may then connect the cargo balls on all four sides with pegs and the clamp where necessary. For example, the cargo balls on the outside of the cluster may use no more than two or three holes, whereas internal structural points may need all four. The number of holes and attachment points may be adapted to balance structural integrity to the rigors of the trip and to the time required to assemble and attach all of the cargo balls. Fewer attachment point may be required. With the option of four holes with pegs and clamps, the cargo balls may be held together securely within the cluster. Even the space plane may have a frame to attach to the same attachment points at the top-facing holes of at least some of the cargo balls. Alternatively, a unique clamp may be used specifically to attach cargo ball cluster to the hull of the space plane.

The pegs and the clamps may be stored with the robotic spider at the orbital shipyard. In this way the pegs can be reused as cluster vessels come and go from the orbital shipyard bring new cargo balls to be assembled and disassembled into the cluster vessels. In some examples magnets may be used as a low-power grasping tool to help the robotic spiders guide the pegs into the hole of a respective cargo ball. The peg may then be held in place temporarily until the robotic spider can physically clamp it. In some examples the cargo balls have a ferromagnetic exterior surface to interact with the launcher. This surface allows low level magnets to attach to the exterior surface. The hole 412 may be a shallow access port to a structural part within the cargo ball. The hole 412 may be a clamping surface. Clamping fixtures and surfaces other than the hole may be used to suit particular implementations.

Figure 13:
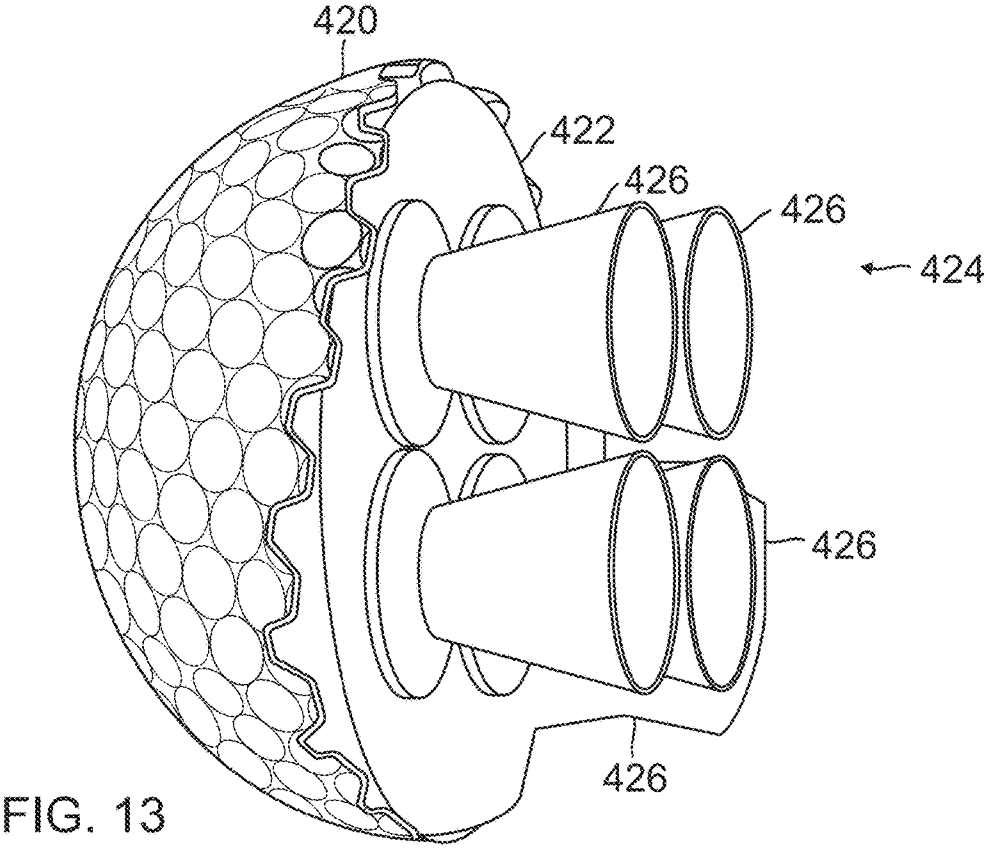
FIG. 13 is an isometric view of a rocket engine cargo ball.

FIG. 13 is an isometric view of a rocket engine cargo ball 420. One side of the exterior surface is removed. The removable portion is about a hemisphere of the total surface. The removable portion is removed to expose a rocket engine 424 of this specialized cargo ball. The engine 424 of the cargo ball has a plurality of large propulsion nozzles 426, e.g., such as four in this example, although any other rocket engine configuration may be used. The remaining part 422 of the exterior surface 420 may serve as an engine shroud to protect other nearby structures from the propulsion nozzles. In another example, the rocket engine 424 is moved out from the center of the cargo ball after the removable portion is removed so that the nozzles extend further out. This also helps to protect other nearby structures.

The four nozzles 426 may be constructed in a manner similar to other four nozzle thrust vectoring systems. This allows the cargo ball vessel to be piloted to the intended destination. A four-nozzle thrust vectoring system was used with the Apollo Command & Service Module (CSM) and with the later Space Shuttle. A thruster system may be included in the rocket engine cargo ball to autonomously control the rocket engine using a controller as described above or the rocket ending may be controlled remotely as part of the cargo ball cluster vessel.

The rocket engine cargo ball 304 may have another specialized cargo ball for fuel storage. A fuel cargo ball may be filled with propulsion fuel and equipped with connector hoses or fuel lines to provide the fuel to the rocket engine cargo ball in flight or to a local tank. External fuel lines from designated fuel cargo balls may also be connected to the space planes, shipyard engines and other equipment. With a conventional rocket, most of the weight is the fuel required to propel the rocket to escape velocity. Once in space, far less fuel is needed because there is no aerodynamic draft and far less gravity. By launching fuel cargo balls from a stratospheric launcher, sufficient fuel can more easily be provided to maintain any of the equipment and life support system being used.

As described herein, there is a process of assembling and operating a cargo ball cluster vessel. A plurality of cargo balls is collected. The cargo balls are assembled into a cluster. The cargo balls are attached together using a plurality of clamps. At least one rocket cargo ball having a rocket engine is attached to an exterior position of the cluster. The cluster is then propelled to a destination using the rocket engine.

As may be used herein, the term "operable to" or "configurable to" indicates that an element includes one or more of components, dimensions, circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled,"

"coupled to," "connected to" and/or "connecting" or "interconnecting" includes direct connection or indirect connection through one or more other intervening components. As may further be used herein, inferred connections (i.e., where one element is connected to another element by inference) includes direct and indirect connection between two items in the same manner as "connected to." As may be used herein, the terms "substantially" and "approximately" provide an industry-accepted tolerance for its corresponding term and/or relativity between items.

Note that the aspects of the present disclosure may be described herein as a process that is depicted as a schematic, a flow chart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the claims. Accordingly, the scope of the claims should be determined by the descriptions herein and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied, or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A cargo ball for operation in space, comprising:

a spherical structure with a spherical exterior surface;

an interior within the exterior surface configured to hold cargo;

a first clamping surface;

a first peg clamped to the first clamping surface and extending from the first clamping surface, the first peg being configured to be clamped to a second peg of a second cargo ball;

at least a first curved cover shaped to lay flush with the spherical exterior surface in an undeployed state and configured to open in a deployed state; and a plurality of thrusters positioned within the interior of the spherical structure, wherein a first thruster of the plurality of thrusters is positioned under the first curved cover within the interior of the spherical structure in the undeployed state, and wherein the first thruster is configured to be deployed through the at least first curved cover to an external position from the cargo ball in the deployed state.

2. The cargo ball of claim 1, wherein the first clamping surface is on the exterior surface.

3. The cargo ball of claim 1 further comprising a hole formed in the exterior surface and wherein the clamping surface is within the hole.

4. The cargo ball of claim 1, wherein the first peg comprises a magnet to hold the first peg against the clamping surface.

5. The cargo ball of claim 1, further comprising a plurality of dimples in a pattern on the exterior surface.

6. The cargo ball of claim 1, wherein the cargo is fuel.

7. The cargo ball of claim 1, further comprising a first arm attached to the first thruster of the plurality of thrusters, wherein the first arm extends through the at least first curved cover to the external position from the cargo ball in the deployed state.

8. The cargo ball of claim 7, wherein the first arm is rotatable through some portion of a circle to allow the first thruster of the plurality of thrusters to be directed in different directions in the deployed state.

9. The cargo ball of claim 1, further comprising:

an outer shell of the spherical outer surface includes a thin ferromagnetic material or superconducting material.

10. The cargo ball of claim 1, wherein the spherical exterior surface includes a plurality of dimples on 60% or more of the exterior surface.

11. A cargo ball for operation in space, comprising:

a spherical structure with a spherical exterior surface;

an interior within the exterior surface configured to hold cargo;

a first clamping surface;

a first peg clamped to the first clamping surface and extending from the first clamping surface, the first peg being configured to be clamped to a second peg of a second cargo ball;

a main engine cover shaped to lay flush with the spherical exterior surface in an undeployed state; and a main engine positioned internal to the cargo ball in the undeployed state and wherein a nozzle of the main engine is exposed from an opened main engine cover in a deployed state.

12. A cargo ball for operation in space, comprising:

a spherical structure with a spherical exterior surface;

an interior within the exterior surface configured to hold cargo;

a first clamping surface, wherein the first clamping surface is formed on the exterior surface;

a first peg clamped to the first clamping surface and extending from the first clamping surface, the first peg being configured to be clamped to a second peg of a second cargo ball;

a second clamping surface, wherein the second clamping surface is on an opposing side of the exterior surface from the first clamping surface; and a second peg clamped to the second clamping surface and extending from the second clamping surface, the second peg being configured to be clamped to a third peg of a third cargo ball.

13. The cargo ball of claim 12, further comprising:

a third clamping surface, wherein the third clamping surface is positioned between the first clamping surface and the second clamping surface on the exterior surface; and a third peg clamped to the third clamping surface and extending from the third clamping surface, the third peg being configured to be clamped to a fourth peg of a fourth cargo ball.

14. The cargo ball of claim 13, further comprising:

a fourth clamping surface, wherein the fourth clamping surface is positioned between the first clamping surface and the second clamping surface on the exterior surface and on an opposing side of the exterior surface from the third clamping surface; and a fourth peg clamped to the fourth clamping surface and extending from the fourth clamping surface, the fourth peg being configured to be clamped to a fifth peg of a fifth cargo ball.

15. A plurality of cargo balls for operation in space, wherein each cargo ball of the plurality of cargo balls comprises:

a spherical structure with a spherical exterior surface;

an interior within the exterior surface configured to hold cargo;

a first clamping surface, wherein the first clamping surface is positioned in an indentation formed in the exterior surface;

a first peg clamped to the first clamping surface and extending from the first clamping surface, the first peg being configured to be clamped to another peg of another cargo ball in the plurality of cargo balls; and a magnet to hold the first peg against the first clamping surface.

16. The plurality of cargo balls of claim 15, wherein each cargo ball of the plurality of cargo balls comprises:

a plurality of dimples formed in and covering substantially all the exterior surface.

17. The plurality of cargo balls of claim 15, wherein each cargo ball of the plurality of cargo balls comprises:

a plurality of thrusters, wherein the plurality of thrusters on each cargo ball maneuver each cargo ball in space to be clamped to another peg of another cargo ball in the plurality of cargo balls.

* * * * *